(12) United States Patent
Freudenthal et al.

(10) Patent No.: US 9,773,426 B2
(45) Date of Patent: Sep. 26, 2017

(54) APPARATUS AND METHOD TO FACILITATE SINGING INTENDED NOTES

(71) Applicant: Board of Regents, The University of Texas System, Austin, TX (US)

(72) Inventors: Eric A. Freudenthal, El Paso, TX (US); Eric M. Hanson, Buena Vista, VA (US); Bryan E. Usevitch, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 15/012,719

(22) Filed: Feb. 1, 2016

(65) Prior Publication Data

US 2016/0293041 A1 Oct. 6, 2016

Related U.S. Application Data

(60) Provisional application No. 62/110,592, filed on Feb. 1, 2015.

(51) Int. Cl.
*G10H 1/00* (2006.01)
*G10H 1/18* (2006.01)
(Continued)

(52) U.S. Cl.
CPC ............... *G09B 15/00* (2013.01); *G10H 1/44* (2013.01); *G10H 2210/066* (2013.01); *G10H 2210/091* (2013.01); *G10H 2210/331* (2013.01)

(58) Field of Classification Search
CPC ............... G10H 2210/066; G10H 1/46; G10H 2210/145; G10H 5/005; G10H 2210/335;
(Continued)

(56) References Cited

U.S. PATENT DOCUMENTS 9,317,561 B2 * 4/2016 Resch ................. G06F 17/3053
2009/0210220 A1 * 8/2009 Mitsuyoshi ............. G10L 25/90
704/207
(Continued)

OTHER PUBLICATIONS

Hanson, E. et al., A Short Note on Pitch, Interval, and Melody Matching Assessment, Technical Report from UTEP (University of Texas at El Paso), Apr. 2017, 6 pages.

*Primary Examiner* — Marlon Fletcher
(74) *Attorney, Agent, or Firm* — Kermit D. Lopez; Luis M. Ortiz; Ortiz & Lopez, PLLC (57) ABSTRACT

A method and apparatus to facilitate tone challenged singers to sing intended notes. In one aspect, the singer determines a note to sing corresponding to an intended frequency $f_i$. The singer utters a note continuously with fundamental frequency $f_u$ into a microphone of the natural ear apparatus. The note is processed by the apparatus to produce sound emphasizing the fundamental frequency $f_u$ and output through a speaker to the auditory organs of the singer. The singer detects differences between intended frequency $f_i$ and uttered fundamental frequency $f_u$. The singer adjusts his vocal organs as he utters the note with the intention of changing $f_u$ to reduce difference between $f_i$ and $f_u$.

20 Claims, 7 Drawing Sheets

(51) Int. Cl.
*G09B 15/00* (2006.01)
*G10H 1/44* (2006.01)

(58) Field of Classification Search
CPC .. H03F 2200/294; H03F 1/3211; G10L 25/90; G10L 25/69; G10L 13/0335; G10L 2025/906; G10L 13/04; G10L 15/01; G10L 2021/0135; G10G 3/04; G10K 2210/3028; G10K 11/1784
See application file for complete search history.

(56) References Cited

U.S. PATENT DOCUMENTS

| | | | | |
|---|---|---|---|---|
| 2013/0339025 | A1* | 12/2013 | Suhami | H04R 25/00 704/271 |
| 2015/0127349 | A1* | 5/2015 | Agiomyrgiannakis | G10L 15/142 704/266 |
| 2015/0350779 | A1* | 12/2015 | McNutt | H04R 3/002 381/71.1 |
| 2016/0042657 | A1* | 2/2016 | Granger | G09B 15/023 84/477 R |
| 2016/0044429 | A1* | 2/2016 | Moffat | G01H 17/00 381/56 |
| 2016/0240181 | A1* | 8/2016 | McNutt | G10K 11/002 |

* cited by examiner

APPARATUS AND METHOD TO FACILITATE SINGING INTENDED NOTES

CROSS-REFERENCE TO RELATED APPLICATIONS

This application claims the benefit of the filing date of U.S. Provisional Patent Application No. 62/110,592, filed on Feb. 1, 2015, and incorporated herein by reference.

STATEMENT REGARDING FEDERALLY SPONSORED RESEARCH

Not applicable.

TECHNICAL FIELD OF THE INVENTION

The present disclosure relates generally to methods and apparatuses that assist a singer to sing intended notes. More particularly, the disclosure relates to methods and apparatuses for assisting a singer or student singer to better comprehend the fundamental frequency and other aspects of their singing utterances, including assisting them in learning to match frequency and other aspects of others' singing.

BACKGROUND

Similar to people who are tone-deaf, tone challenged singers cannot or are unreliable at uttering tones that match the fundamental frequency of a tone emitted from another source or correspond to the sequence of tones of a familiar melody. However, unlike people who are tone-deaf, those who are tone challenged can distinguish whether a sequence of tones emitted from an external source (e.g. another singer or musical instrument) approximates the relative sequence of tones of a familiar melody. A person's utterances are a composite of multiple frequencies, primarily consisting of a "fundamental" tone and its harmonics. People who are tone challenged have difficulty determining if the fundamental tone from the spectrum of frequencies within their utterances corresponds to the tone they intended to utter. The condition of being tone challenged and tone deaf is generally not distinguished, and is colloquially referred to as "tin ear." Thus, as an example of the tin ear condition, a singing instructor utters a note N and asks student singers to imitate her singing. Singers who have neither of these conditions can hear and discern the fundamental frequency within the note they utter and can easily tune their vocal cords to emit the note N. In contrast, singers who are tone challenged may be able to distinguish the frequency of the note N sung by the instructor and attempt to utter this note. But because the singer is tone challenged and has difficulty discerning the fundamental frequency in their own utterances, they are not able to imitate the note N sung by the instructor.

As such, a method and apparatus is needed to assist tone challenged singers to better discern the fundamental frequency in their voice utterances.

SUMMARY

In view of the aforementioned problems, embodiments of the present invention provide a method and apparatus to enable people who can discern other's pitch to sing notes at intended frequencies. The disclosed embodiments of the invention described below are referred to as the "natural ear."

According to a first aspect, a method for facilitating tone challenged singers to utter intended notes is disclosed. The method includes the singer determining a note to sing corresponding to an intended frequency $f_i$. The singer utters a note with fundamental frequency $f_u$. A natural ear device receives the sound, processes the sound to emphasize the fundamental frequency $f_u$ and outputs the sound to the auditory organs of the singer. The singer detects differences between intended frequency $f_i$ and uttered fundamental frequency $f_u$ and adjusts her vocal organs as she sings the note with the intention of changing $f_u$ to reduce difference between $f_i$ and $f_u$.

According to a second aspect, an apparatus to facilitate tone challenged singers to utter intended notes is disclosed. The apparatus includes an input transducer that receives sound from the singer. The apparatus also includes one or more amplification devices whose input is coupled to the input transducer that amplifies sound from the input transducer. The one or more amplification device includes a filtering device that modifies the frequency composition of the sound from the input transducer to attenuate harmonics of the fundamental frequency. The apparatus further includes an output transducer coupled to the amplification device that receives the amplified and filtered sound. The output transducer produces amplified and filtered sound into the auditory organs of the singer.

According to a third aspect, an apparatus to facilitate tone challenged singers to utter intended notes is disclosed. The apparatus comprises an input transducer that receives sound from the singer. The apparatus also includes a processor that can be a digital signal processor (DSP) coupled to the input transducer that amplifies selected frequencies of the singer's voice. The apparatus further includes an output transducer coupled to the processor that receives the sound. The output transducer produces sound processed by the processor into the auditory organs of the singer.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter can be better understood by reference to one or more of these drawings in combination with the description of embodiments presented herein. Consequently, a more complete understanding of the present embodiments and further features and advantages thereof can be acquired by referring to the following description taken in conjunction with the accompanying drawings, in which like reference numerals may identify like elements, wherein:

NOTATION AND NOMENCLATURE

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection can be through a direct connection, or through an indirect connection via other devices and connections. In the field of music, fundamental frequency f is also referred to as the first harmonic frequency H1. Similarly, the second harmonic frequency H2 is 2*H1 or 2*f, third harmonic frequency H3 is 3*H1 or 3*f and so on. The fundamental frequency f depicted in frequency spectrum graph of singer's voice utterances is referred to in this description as $f_u$ ($f_{utterance}$) for shortening of notation. Filtering sound means applying a filter to modify the frequency composition of the sound.

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that can be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described in this specification. In the development of any such actual embodiment, numerous implementation-specific decisions may need to be made to achieve the design-specific goals, which can vary from one implementation to another. It will be appreciated that such a development effort, while possibly complex and time-consuming, would nevertheless be a routine undertaking for persons of ordinary skill in the art having the benefit of this disclosure.

In accordance with various embodiments of this invention, the natural ear device assists a person who is tone challenged by allowing her to distinguish the fundamental frequency of her utterance from the other harmonics present in the utterance. Thus, using the natural ear device, a tone challenged person can match the pitch of tones from other sources or properly sing a relative sequence of tones from a song's melody.

Figure 1:
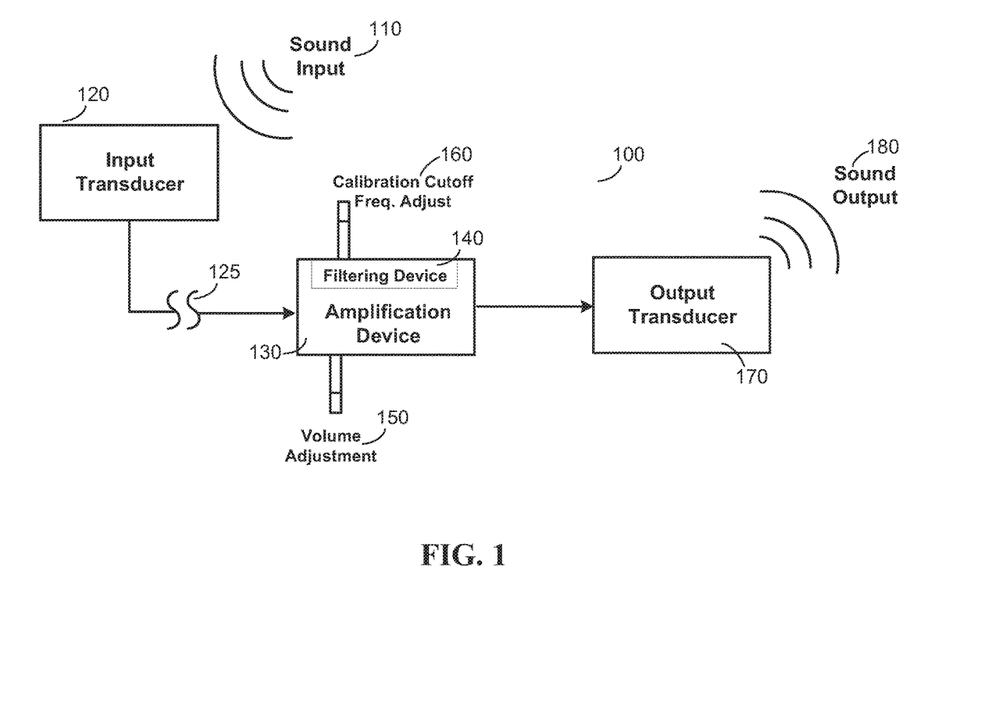
FIG. 1 depicts a natural ear device to facilitate singing intended notes in accordance with some embodiments of this disclosure.
Figure 4:
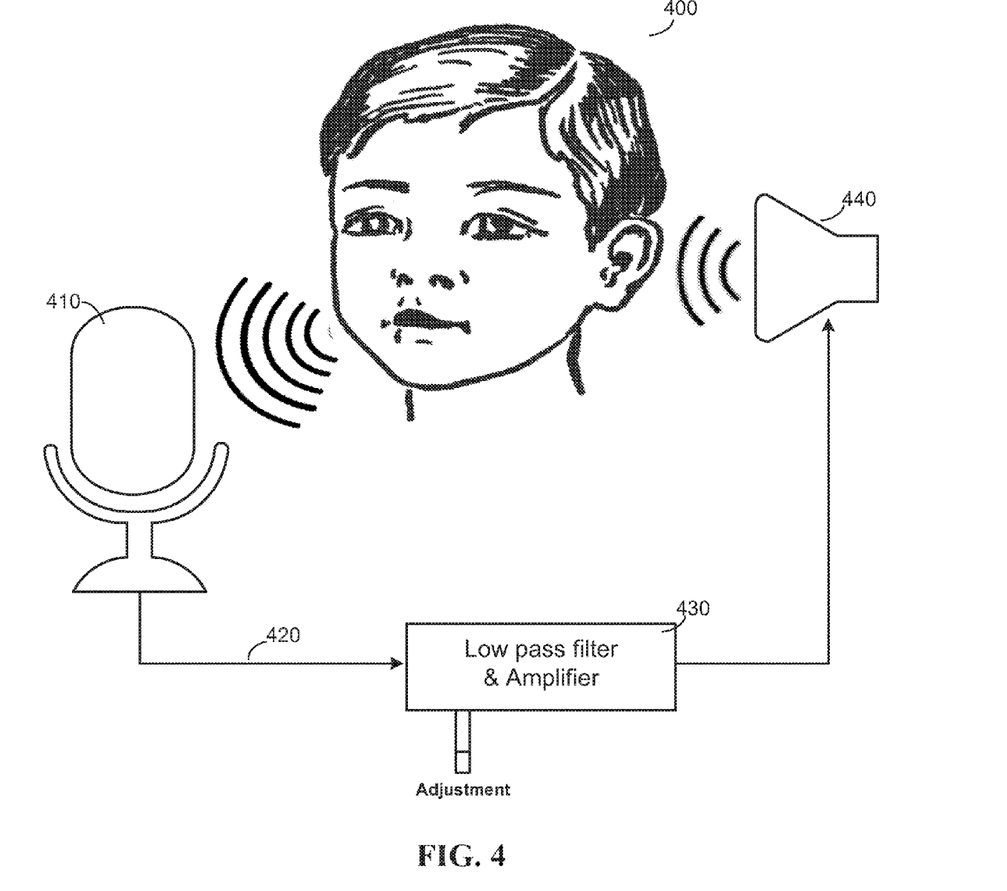
FIG. 4 illustrates one exemplary embodiment of the natural ear device of FIG. 1 showing singer interaction with the device.

Referring to FIG. 1, in accordance with some embodiments of this disclosure, a natural ear device 100 for facilitating tone challenged singers to utter intended notes is illustrated. The singer utters sound at input 110 into input transducer 120. In some embodiments of this disclosure, input transducer 120 can be a microphone 410 as shown in FIG. 4. In accordance with the embodiment shown in FIG. 1, input transducer 120 couples to amplification device 130 through wireless connection 125. In various embodiments, amplification device 130 can be an amplifier. Wireless connection 125 can be a Bluetooth connection or similar functionality connection. In accordance with other embodiments, input transducer 120 can couple to amplification device 130 through a wired connection (not shown in FIG. 1). In FIG. 4, microphone 410 that can be a directional microphone in some embodiments couples to low pass filter and amplifier 430 through wired connection 420. Returning to FIG. 1, amplification device 130 includes a volume adjustment control 150 accessible to the singer. Volume adjustment control 150 can be a switch, potentiometer, or similar input control device. In accordance with some embodiments of this disclosure, an integrated filtering device 140 within amplification device 130 can be a low-pass filter with a cutoff frequency $f_c$. In accordance with other embodiments not shown in the figures, amplification device 130 can be divided into two amplifiers. In such embodiments, the amplification device 130 comprises a separate pre-amplifier that receives low level signals from the microphone and a power-amplifier capable of emitting sufficient wattage to power output transducer 170. Filtering device 140 can be between the pre-amplifier and the power amplifier. In accordance with some embodiments of this disclosure, filtering device 140 that is a low pass filter includes a cutoff frequency $f_c$ adjustment mechanism 160 used to calibrate the natural ear for different singers. As each singer has a different fundamental frequency and second and third harmonic frequency based on age, whether male or female, style of singing and other physical characteristics, the adjustment mechanism 160 can be used to initially calibrate the cutoff frequency $f_c$ of the low pass filter. As explained below, the cutoff frequency $f_c$ of the low pass filter for optimal performance of the natural ear could be between the second and third harmonic of the singer's voice.

In accordance with some alternative embodiments of amplification device 130 and filtering device 140, a digital signal processor (DSP) or general purpose microprocessor can digitally process the sound signals from input transducer 120. The DSP or general purpose microprocessor, in conjunction with an analog-to-digital (A/D) converter, digital-to-analog (D/A) converter, and analog circuitry, can retain and amplify the fundamental frequency and even harmonics of the singer's voice while selectively suppressing or enhancing other harmonics. The digital signal processor can be a Texas Instruments® TMS320C5535 or TMS320C6455

DSP or similar DSP implementing the functionality of the amplifier and filter. As described in greater detail below, a DSP or microprocessor implementation can allow such features as auto calibration, surrounding noise reduction and auto volume adjust to further clarify and enhance the fundamental frequency and possibly some even harmonics in the singer's voice.

In accordance with some embodiments of the present disclosure, amplified and filtered sound 180 emphasizing the fundamental frequency is produced by output transducer 170. As shown in FIG. 4, in some embodiments, output transducer 170 can be speaker 440, a headset (not shown), or wearable devices with similar functionality to the headset. Returning to FIG. 1, output transducer 170 is coupled to amplification device 130 and filtering device 140 via a wire but other embodiments may be a wireless connection such as Bluetooth.

Figure 2:
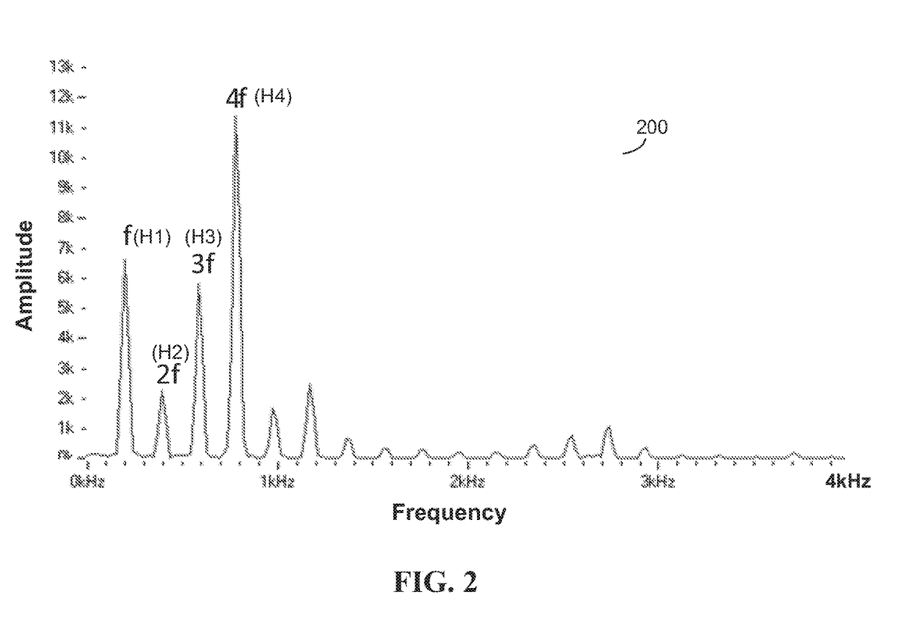
FIG. 2 is a graph of the frequency spectrum of a singer's voice.

Turning now to FIG. 2, an exemplary frequency spectrum graph 200 of a singer's utterances is illustrated. Frequency spectrum graph 200 shows the singer's utterances contain a fundamental frequency component f, second harmonic 2f, third harmonic 3f, fourth harmonic 4f and so on till the amplitude of the harmonics become very small. After the sixth harmonic, the amplitude approaches close to zero. As music teachers, singers and lovers of song understand, a singer's utterances have harmonious and unharmonious frequency components. The fundamental frequency f and even harmonics including 2f, 4f, 6f and so on are harmonious. Odd harmonics such as 3f, 5f, 7f and so on are not harmonious. As explained above, singers who are tone challenged cannot clearly discern the fundamental frequency of a note in their own utterances due to the associated and coincidental harmonics. Tone challenged singers frequently 1) improperly identify one or more odd harmonics as the fundamental frequency of the note and/or 2) are unable to discern the fundamental frequency that they are singing. Thus, in FIG. 2 a tone challenged singer might identify the loud odd harmonic 3f as their fundamental frequency and sing with this unharmonious odd harmonic as their fundamental frequency! The natural ear device as described in this disclosure creates an artificial acoustic path from the mouth to ear that accentuates and amplifies the fundamental frequency. In accordance with some exemplary embodiments of this disclosure including a digital signal processor, the natural ear device can accentuate and amplify the fundamental frequency and even harmonics uttered by the singer.

Figure 3:
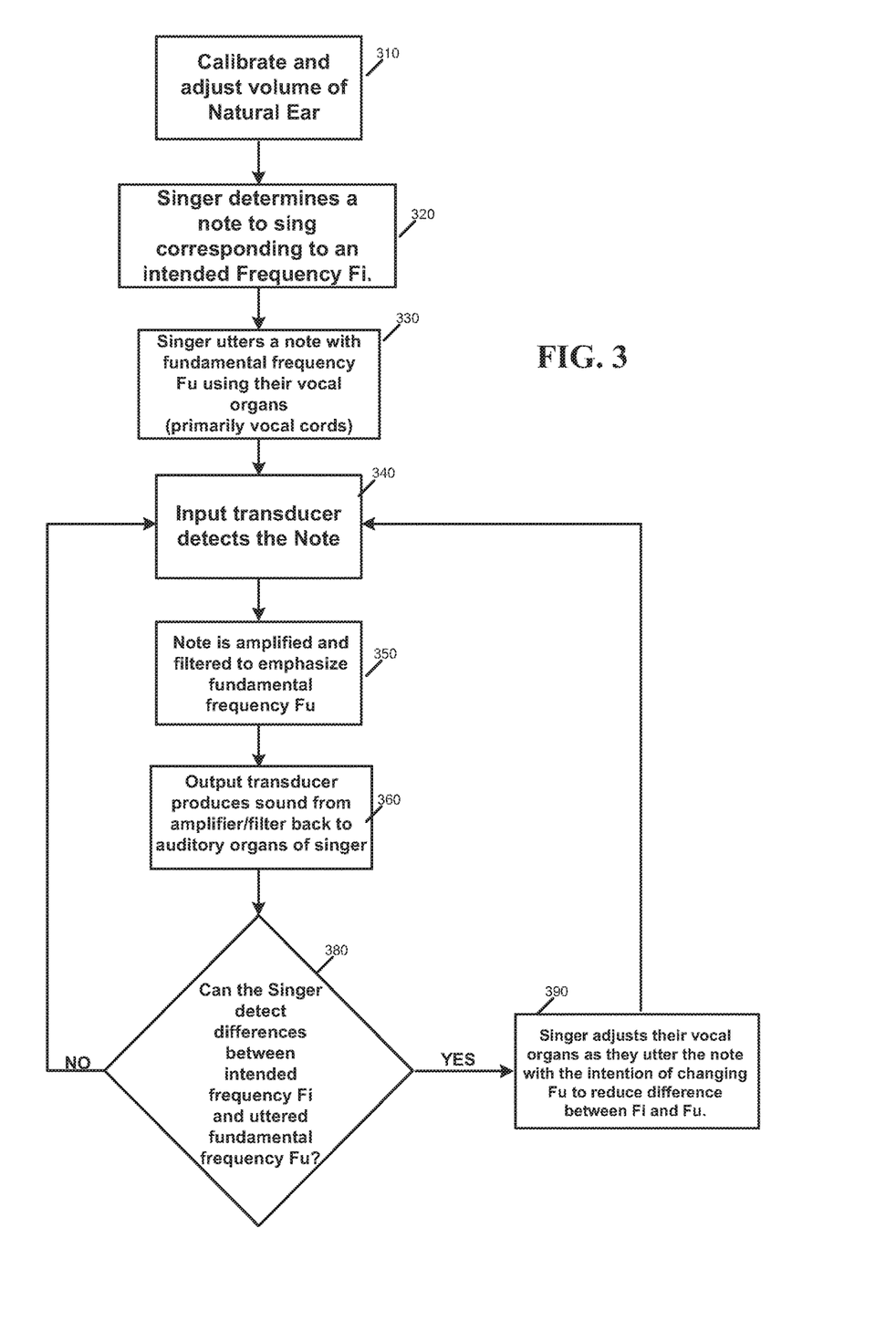
FIG. 3, in accordance with some embodiments of the present disclosure, depicts a process for using and operating the natural ear device.

FIG. 3, in accordance with some embodiments of the present disclosure, depicts a process for using and operating the natural ear device. In block 310, in accordance with some embodiments of the present disclosure, the natural ear is calibrated for the singer before the singer starts signing. In some embodiments in which a microprocessor or digital signal processor replaces amplification device 130 and filtering device 140 shown in FIG. 1, an automatic calibration system can calibrate the natural ear to emphasize harmonious fundamental frequency and, possibly, even harmonics of the singer's voice while attenuating odd harmonics. Some embodiments of the automatic calibration system comprise the steps of placing the device into auto calibration mode and instructing the singer to sing a range of notes in their vocal range into input transducer 120. The DSP selects the proper frequencies that allow the singer to perceive harmonious sound from the output transducer 170. In some other embodiments, manual calibration can be performed by a human operator who sets the cutoff frequency $f_c$ of the low pass filter. Manual calibration can comprise the steps of asking the singer to sing their lowest note at fundamental frequency f (see FIG. 2) and then setting the low pass filter cutoff frequency $f_c$ between f and 3f to strongly attenuate frequencies approaching and above either 2f or 3f.

Manual calibration of the natural ear in block 310 can include the manual adjustment of the volume control 150 (FIG. 1) to a comfortable and effective level for the singer. As the singer is using the natural ear, they can further adjust the volume to an effective level. An automatic calibration system might initially auto adjust the volume level based on surrounding noise and then during use of the natural ear adjust the volume level based upon usage conditions and surrounding noise.

In FIG. 3 at block 320, the singer determines a note to sing corresponding to an intended frequency $f_i$. The singer starts singing in block 330 and utters a note with fundamental frequency $f_u$ using their vocal organs, particularly their primary vocal cords. As the natural ear processes the sound in blocks 340-390, the singer is continuously singing the note and does not stop. In accordance with various embodiments, the input transducer detects the note in block 340. In block 350, the frequencies in the uttered note are amplified and filtered to emphasize the fundamental frequency $f_u$. In the next block 360, the output transducer produces sound into the auditory organs of the singer. If the singer does not detect differences between intended frequency $f_i$ and uttered fundamental frequency $f_u$, she continues to sing the note and process loops back to block 340. If the singer does detect differences between the intended frequency $f_i$ and uttered fundamental frequency $f_u$, the process goes to block 390. In block 390, as the singer continues to sing the note, the singer adjusts their vocal organs with the intention of changing fundamental frequency $f_u$ to reduce the difference between $f_i$ and $f_u$ and process loops back to block 340.

In accordance with some embodiments, the disclosed natural ear apparatus and process of use can assist a singer (or learner) to better comprehend the fundamental frequency $f_u$ and other aspects of their utterances, including assisting them in learning to match frequency and other aspects of others' singing.

Referring to FIG. 4, one exemplary embodiment of the natural ear device of FIG. 1 showing singer interaction with the natural ear device is illustrated. As shown in the figure, singer 400 utters a note into microphone 410. Microphone 410 is coupled to amplifier and low pass filter 430 through wired connection 420. The audio signal from microphone 410 is fed into the amplifier and low pass filter 430. Amplifier and low pass filter 430 accentuates and amplifies the fundamental frequency while suppressing other harmonics. An adjustment is present on the amplifier to increase the volume and in some embodiments as described above can be used during calibration to adjust the cutoff frequency $f_c$ of the low pass filter so that the filter passes the fundamental frequency and attenuates harmonics. Speaker 440 couples to amplifier and low pass filter 430 through a wired connection. The amplifier and low pass filter 430 send a signal emphasizing fundamental frequency to speaker 440 that produces sound into the singer's ears.

Figure 5:
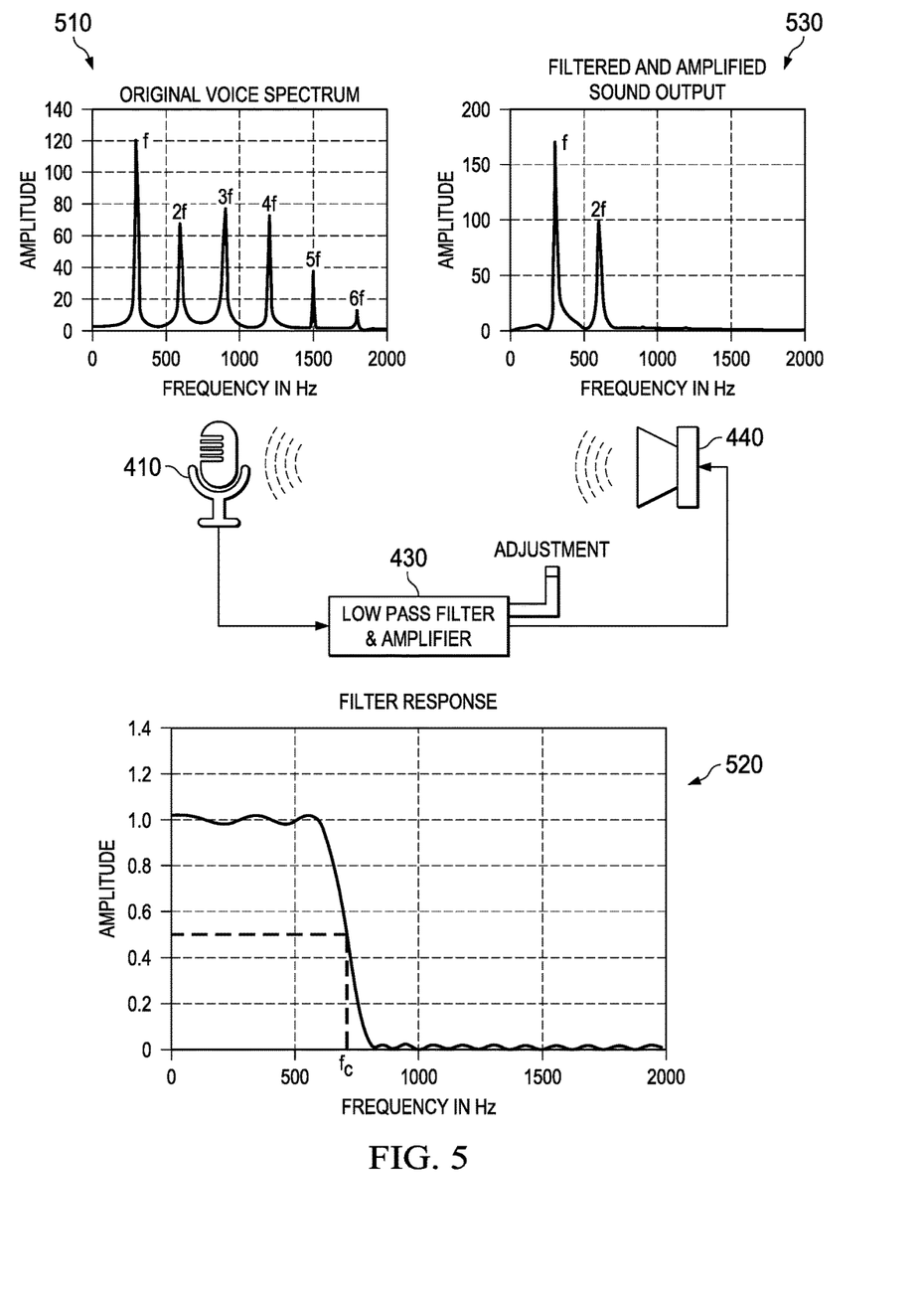
FIG. 5 illustrates amplitude versus frequency graphs of sound at input and output transducers and the low pass filter response.

FIG. 5 illustrates the exemplary embodiment of the natural ear device of FIG. 4 including the frequency spectrum of the sound at the microphone and speaker. FIG. 5 also depicts the frequency response 520 of the low pass filter in accordance with some embodiments. In FIG. 5, one singer's original voice spectrum 510 is depicted. This singer's voice spectrum includes a fundamental frequency component f at 300 Hz and harmonics at 2f (600 Hz), 3f (900 Hz), 4f (1200 Hz), 5f (1500 Hz) and 6f (1800 Hz). The fundamental frequency component has an approximate amplitude of 120 and second harmonic 2f has an approximate amplitude of 65. The frequency response 520 of the low pass filter approximates one, that is pass through of the signal at the filter input to its output, up to a cutoff frequency $f_c$ of approximately 700 Hz. The cutoff frequency $f_c$ defines the boundary between frequencies that are emphasized versus frequencies that are attenuated. In accordance with some embodiments of this disclosure, the cutoff frequency of the low pass filter is determined during calibration of the natural ear device for the singer as described above. In accordance with other embodiments, the cutoff frequency $f_c$ can be set during manufacture of the natural ear device for fundamental frequencies over a certain range. Thus, natural ear devices sold to the public can specify on the packaging a range of fundamental frequencies to accommodate different people's utterances.

Referring to the sound output in speaker 440 of FIG. 5, the frequency spectrum of the filtered and amplified output sound 530 is illustrated. Voice spectrum 510 is low pass filtered and amplified in device 430 to generate the filtered and amplified sound 530 at speaker 440. Based on the volume adjustment, the amplitude of the fundamental frequency component f at 300 Hz is approximately 170 and the second harmonic at 2f (600 Hz) is approximately 100. All other harmonics (3f, 4f, 5f, 6f, and so on) are attenuated by the low pass filter to zero amplitude from speaker 440. Thus, the singer hears the harmonious amplified fundamental and second harmonic and is able to compare this sound to the sound they desire at their intended frequency $f_i$.

Figure 6:
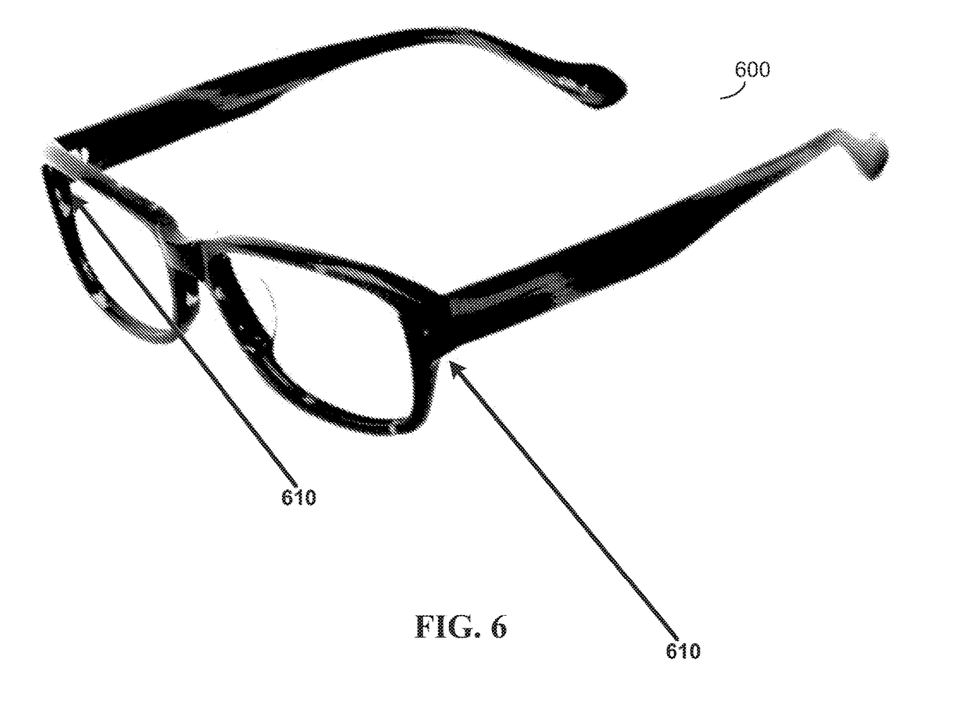
FIG. 6, in accordance with some embodiments of this disclosure, depicts a directional microphone array incorporated into an eyeglass frame for use in the natural ear device.

Turning now to FIG. 6, in accordance with some embodiments of this disclosure, a microphone 610 that in some embodiments is a directional array incorporated into an eyeglass frame 600 for use in the natural ear device is illustrated. In some other embodiments that are not shown in FIG. 6, the directional microphone array can be attached to ordinary eyeglass frames and separable from the frames. The directional microphone array can electronically and/or acoustically implement a directional phase-array sensor or other technique aimed at the wearer's mouth to aid in rejecting sounds from other sources. Thus, the singer using the natural ear device in a group chorus can distinguish their own voice from the wide set of others' voices, allowing the singer to stay on tone and harmoniously sing on his intended frequency. The natural ear helps those who lack "self-hearing" capabilities.

Other wearable devices incorporating the directional microphone array can be earpiece devices and microphone attachments to the neck or chest that are not visible to the audience.

In accordance with some embodiments of the present disclosure, amplifier and low pass filter 430 can be integrated into a wearable device such as the eyeglass frame 600 that also includes a directional microphone array. In other embodiments incorporating a digital signal processor to accentuate and amplify the singer's fundamental frequency and harmonious frequency components, the DSP can be integrated into a wearable device or connected via wires or wireless link such as Bluetooth. Thus, in some embodiments as discussed below, a cell phone, in addition to its other functions such as multimedia playback and phone conversation, could be used to perform the signal processing of the natural ear device.

Figure 7:
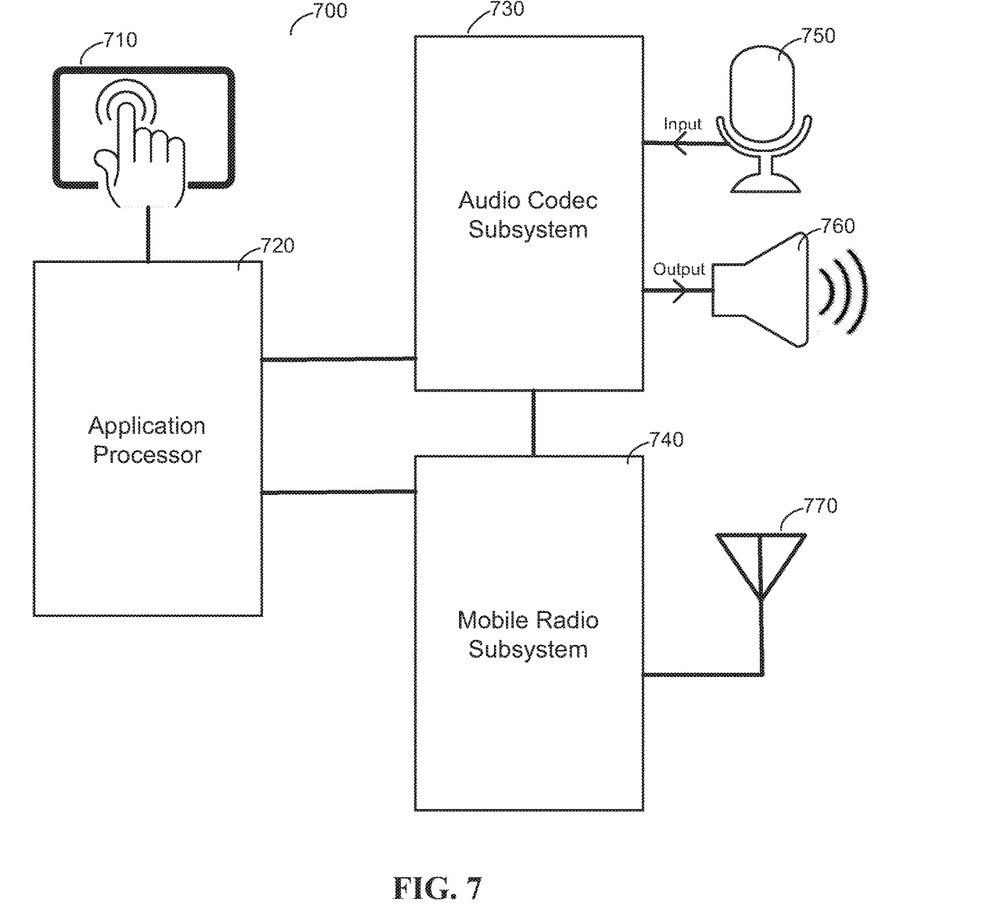
FIG. 7 depicts a schematic cell phone diagram in accordance with some embodiments that implement the natural ear device.

FIG. 7 is a schematic diagram of a cell phone 700 in accordance with some embodiments of the present disclosure that implements the natural ear device. User interface 710 that can be a touch screen in some exemplary embodiments, allows the singer to select the natural ear application software. The application is executed in application processor 720 that in accordance with some embodiments can be a Texas Instruments®, Cirrus Logic®, Inc. or similar digital signal processor. The application processor 720 couples to a mobile radio subsystem 740 that receives and transmits voice and data signals for the cell phone. The mobile radio couples to an antenna 770 for receiving and transmitting voice and data signals that in some exemplary embodiments of this disclosure is incorporated into the cell phone body and not a separate antenna. Application processor 720 and mobile radio subsystem 740 couple to audio codec subsystem 730. Microphone 750 receives sound from a singer that is input to audio codec 730. Speaker 760 receives amplified and filtered sound from audio codec subsystem 730. In accordance with some embodiments of this disclosure, audio codec subsystem 730 can comprise circuitry to implement a digital low pass filter and amplifier. In accordance with other embodiments, audio codec subsystem 730 can be a secondary DSP that includes functionality to emphasize harmonious fundamental frequency and even harmonics of the singer's voice while attenuating odd harmonics. The audio codec subsystem 730 can implement a singer specific calibration system for the natural ear device as described in more detail above with reference to FIG. 3. Exemplary embodiments of the application processor 720, mobile radio subsystem 740 and audio codec subsystem 730 for implementation of the natural ear device are shown and described in "Unleashing the Audio Potential of Smartphones: Dedicated Audio ICs Like Smart Audio Codecs and Hybrid Class-D Amplifiers Can Help Solve System Level Challenges" by Rob Kratsas, Cirrus Logic, Inc., Austin, Tex., http://www.cirrus.com/en/pubs/whitePaper/smartphone-s_wp.pdf incorporated herein by reference in its entirety.

The natural ear device described in the embodiments of this disclosure assist singers who have difficulty discerning which frequency in a note is the fundamental frequency or "correct" frequency when they are singing. The natural ear device has been tested on a singer. The device was placed on the singer's ear, adjusting the volume of the device for comfort and depending on the singer's need. Generally, the more the singer has difficulty in matching the note, the higher the volume can be adjusted and more filtering can be added. The singer using the natural ear device had an instant improvement in their frequency matching and became more self-aware of how they blended and balanced with other singers who sang with them.

In accordance with the embodiments described in this disclosure, the natural ear apparatus provides the ability to clearly hear and discern the fundamental frequency of one's own voice and minimizes confusion due to modifications in spectra caused by the bones, sinuses, tissue, etc. inside of the head. Filtering present in the natural ear device attenuates or removes distractions present in the pitch itself, limiting the overtones that are produced, and reducing the sound to its formant, or fundamental frequency.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments can include processes that use fewer than all of the disclosed operations, processes that use additional operations, and processes in which the individual operations disclosed herein are combined, subdivided, rearranged, or otherwise altered.

This disclosure may include descriptions of various benefits and advantages that may be provided by various embodiments. One, some, all, or different benefits or advantages can be provided by different embodiments.

In view of the wide variety of useful permutations that can be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A method for facilitating singing of intended notes by a tone challenged signer, said method comprising:
    detecting with a natural ear device a note uttered at a fundamental frequency $f_u$ by a tone-challenged singer who prior to uttering said note at said fundamental frequency $f_u$ intends to sing said note at an intended frequency $f_i$;
    amplifying and filtering with said natural ear device said note detected by said input transducer to emphasize said fundamental frequency $f_u$ of said note produced by said tone-challenged singer;
    producing a sound output with said natural ear device to the auditory organs of said tone-challenged singer, wherein if said tone-challenged singer detects differences between said intended frequency $f_i$ and said uttered fundamental frequency $f_u$ in said sound output, said sound output from said natural ear device facilitates said tone-challenged singer in adjusting said note as said tone-challenged singer sings said note to thereby reduce differences between said intended frequency $f_L$ and said fundamental frequency $f_u$.

2. The method of claim 1, wherein said detecting said note uttered at said producing sound emphasizing the fundamental frequency $f_u$ by said tone-challenged singer, further comprises:
    detecting said note with an input transducer.

3. The method of claim 1, wherein said producing said sound output further comprises producing said sound output with an output transducer.

4. The method of claim 1, wherein said amplifying and filtering said note further comprises amplifying and filtering said note with an amplifier and filter component.

5. The method of claim 2 further comprising modifying a frequency composition of said note with a low-pass filter with an amplifier to emphasize said fundamental frequency $f_u$.

6. The method of claim 2, wherein said amplifying and filtering said note to emphasize said fundamental frequency $f_u$, further comprises: amplifying and filtering said note to emphasize said fundamental frequency $f_u$ and selected even harmonic frequencies.

7. The method of claim 6, wherein a digital signal processor amplifies and modifies a frequency composition of the note to emphasize the fundamental frequency $f_u$ and the selected even harmonic frequencies.

8. The method of claim 1, wherein the natural ear device comprises a software application executing on a cell phone.

9. The method of claim 5, further comprising calibrating the natural ear device by:
    allowing said tone-challenged singer to sing a lowest note at a fundamental frequency $f_u$ using said natural ear device; and
    setting a low-pass filter cutoff frequency $f_c$ with respect to said low-pass filter between f and 3f in order to attenuate undesirable harmonics over 2f.

10. The method of claim 1 further comprising automatically calibrating the natural ear device by:
    placing the natural ear device into an auto calibration mode;
    instructing the tone-challenged singer to utter various notes into the natural ear device; and
    filtering via the natural ear device the frequencies in the notes to accentuate and amplify harmonious sound.

11. The method of claim 2, wherein the input transducer comprises a microphone embedded into an eyeglass frame.

12. The apparatus of claim 3, wherein the output transducer comprises a wearable output transducer device.

13. An apparatus that facilitates singing of intended notes by a tone-challenged singer, said apparatus comprising:
    an input transducer that detects a note uttered at a fundamental frequency $f_u$ by a tone-challenged singer who prior to singing said note at said fundamental frequency $f_u$ intends to sing said note at an intended frequency $f_i$;
    an amplifier and filter component connected to said input transducer, wherein said amplifier and filter component amplifies and filters said note detected by said input transducer to emphasize said fundamental frequency $f_u$ of said note produced by said tone-challenged singer; and
    an output transducer connected to said amplifier and filter component, wherein said note amplified and filtered by said amplifier and filter component is input to said output transducer which in turn produces a sound output to auditory organs of said tone-challenged singer, wherein if said tone-challenged singer detects differences between said intended frequency $f_i$ and said uttered fundamental frequency $f_u$ in said sound output, said sound output from said output transducer facilitates said tone-challenged singer in adjusting said note as said tone-challenged singer sings said note to thereby reduce differences between said intended frequency $f_i$ and said fundamental frequency $f_u$.

14. The apparatus of claim 13 wherein said amplifier and filter component comprises an amplifier and a filter, said amplifier comprising a switch for volume adjustment that is accessible to said tone-challenged singer, and said filter comprising a cutoff frequency adjustment mechanism for calibration of said apparatus.

15. The apparatus of claim 13 further comprising a digital signal processor that enables an auto calibration mode of said apparatus, wherein a user enables said auto calibration mode, and wherein said digital sign processor is coupled to said input transducer and assists n amplifying said frequency $f_u$ and selected even harmonic frequencies of a voice of said tone-challenged singer while attenuating odd harmonic frequencies.

16. The apparatus of claim 13 wherein said input transducer comprises a directional microphone.

17. The apparatus of claim 13 wherein said input transducer comprises a microphone embedded into an eyeglass frame.

18. The apparatus of claim 13 wherein said input transducer comprises a microphone embedded into a wearable input transducer device.

19. The apparatus of claim 14 wherein said filter comprises a low-pass filter that modifies a frequency composition of said note to emphasize said fundamental frequency $f_u$.

20. The apparatus of claim 13 wherein said amplifier and filter component amplifiers and filters said note to emphasize said fundamental frequency $f_u$ and selected even harmonic frequencies.

\* \* \* \* \*